(12) United States Patent
Junker et al.

(10) Patent No.: US 9,470,089 B2
(45) Date of Patent: *Oct. 18, 2016

(54) FACE EQUIPMENT COMPRISING HOSE LEVELS PLACED ON THE SHIELD SUPPORT FRAMES OF SAID FACE EQUIPMENT

(75) Inventors: Martin Junker, Essen (DE); Armin Mozar, Hamm (DE)

(73) Assignee: RAG AKTIENGESELLSCHAFT, Herne (DE)

( * ) Notice: Subject to any disclaimer, the term of this patent is extended or adjusted under 35 U.S.C. 154(b) by 14 days.

This patent is subject to a terminal disclaimer.

(21) Appl. No.: 14/390,342

(22) PCT Filed: Apr. 2, 2012

(86) PCT No.: PCT/EP2012/055940
§ 371 (c)(1),
(2), (4) Date: Oct. 2, 2014

(87) PCT Pub. No.: WO2013/149638
PCT Pub. Date: Oct. 10, 2013

(65) Prior Publication Data
US 2015/0069814 A1    Mar. 12, 2015

(51) Int. Cl.
*E21D 23/16* (2006.01)
*E21D 23/26* (2006.01)
(Continued)

(52) U.S. Cl.
CPC ............ *E21D 23/26* (2013.01); *E21C 31/08* (2013.01); *E21C 35/04* (2013.01); *E21C 35/24* (2013.01); *E21D 23/12* (2013.01); *G01C 5/04* (2013.01)

(58) Field of Classification Search
CPC .................................................. E21D 23/12
See application file for complete search history.

(56) References Cited

U.S. PATENT DOCUMENTS 4,452,078 A    6/1984  Formanek et al.
6,425,299 B1 *  7/2002  Henderson ............ G01B 13/14
                                              33/367
(Continued)

FOREIGN PATENT DOCUMENTS

DE          4333032 C2     11/1996
DE      102009026011 A1    12/2010
(Continued)

OTHER PUBLICATIONS

International Search Report for PCT/EP2012/055940, dated Dec. 20, 2012.

*Primary Examiner* — John Kreck
(74) *Attorney, Agent, or Firm* — Johnson, Marcou & Isaacs, LLC; Jennifer S. Stachniak

(57) ABSTRACT

A face equipment for mechanical extraction in longwall mining, in particular in the underground hard coal mining industry, includes a face conveyor (21) arranged along the coal face, an extraction mechanism (22) that can be moved along the face conveyor (21), and shield support frames (10) fastened at an angle to the face conveyor (21). In order determine the shield height of the extended shield support frame (10) corresponding to the face opening height, a flexible hose level (17) with a liquid-filled hose (18) is installed between the roof canopy (13) and floor skid (11) of individual shield support frames (10), and a pressure sensor (19) is arranged on the skid-side end of the hose (18). An inclination measuring device (25) is arranged on the roof canopy (13), and the pressure sensor (19) and inclination measuring device (25) are connected to an analyzing and control unit.

15 Claims, 2 Drawing Sheets

(51) Int. Cl.
*E21C 31/08* (2006.01)
*E21C 35/04* (2006.01)
*E21C 35/24* (2006.01)
*E21D 23/12* (2006.01)
*G01C 5/04* (2006.01)

(56) References Cited

U.S. PATENT DOCUMENTS 7,775,748 B2 * 8/2010 Koenig .................. E21D 23/12
405/296

2012/0161493 A1 * 6/2012 Junker .................... E21C 35/24
299/1.1
2015/0204191 A1 * 7/2015 Melat ...................... E21C 27/32
299/1.05

FOREIGN PATENT DOCUMENTS

WO 2009/103303 A1 8/2009
WO 2011/144223 A1 11/2011

* cited by examiner

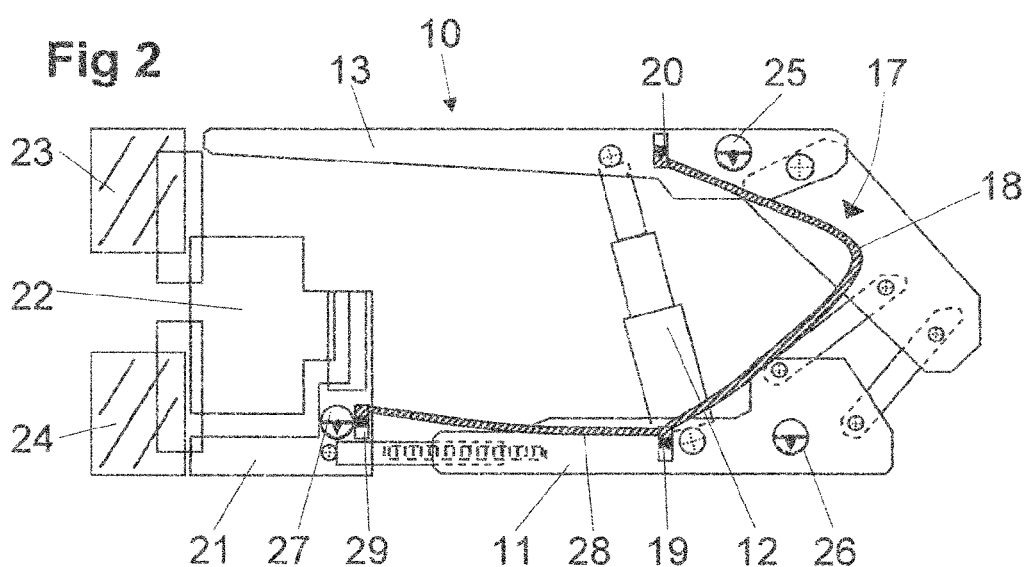
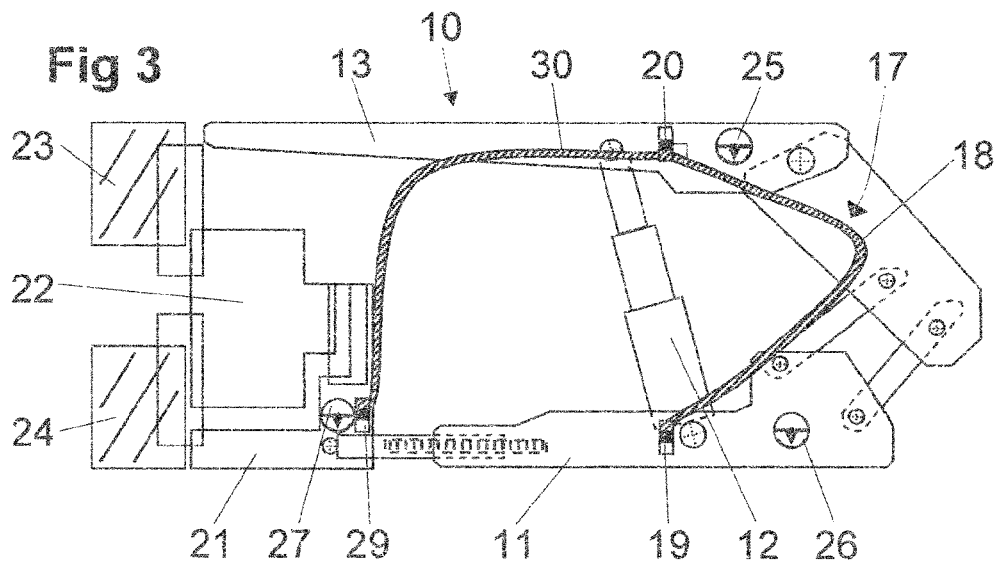
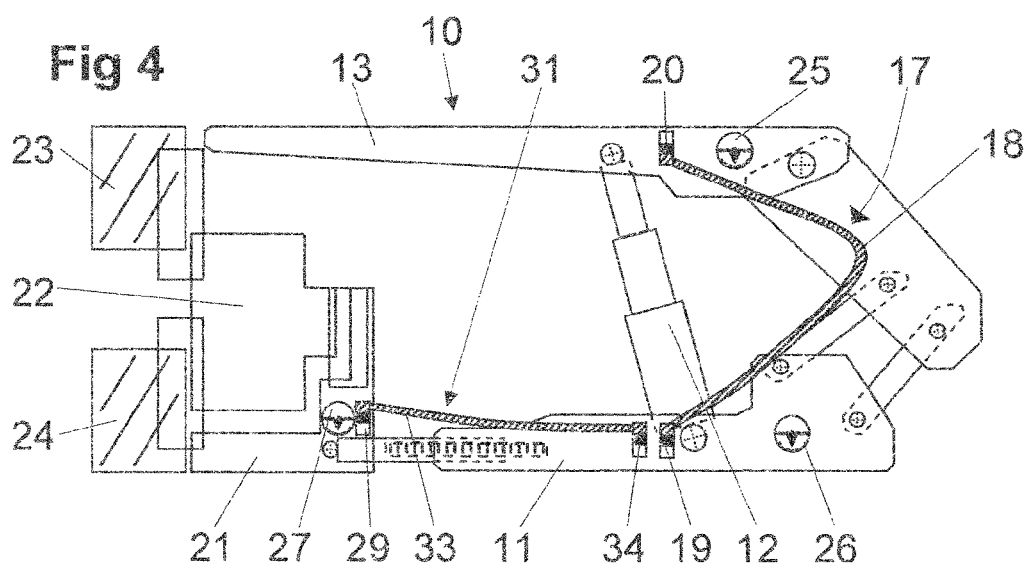

FACE EQUIPMENT COMPRISING HOSE LEVELS PLACED ON THE SHIELD SUPPORT FRAMES OF SAID FACE EQUIPMENT

The instant application should be granted the priority date Apr. 2, 2012, the filing date of the international patent application PCT/EP2012/055940.

BACKGROUND OF THE INVENTION

The invention relates to a face equipment for mechanical extraction in longwall mining, in particular in the underground hard coal mining industry, comprising a face conveyor arranged along the mining wall, an extraction means that can be moved along the face conveyor, and shield support frames supported on the face conveyor at an angle thereto.

WO 2009/103303 describes a face equipment with the aforementioned features along with a method for controlling such a face equipment. To this end, the above publication explains in detail that automating such a controller for the face equipment generally depends on knowing where the face equipment is positioned in the room, but especially on knowing the respective height of the face opening that exists in the region of the front end of the roof canopy of the shield support frame. The respective base values for calculating the face opening height is determined in this prior art by means of inclination sensors secured to the main components of the shield support frame, such as the floor skid, gob shield, support connection rod and roof canopy, which determine the inclination of the respective components against the vertical. By comparing the recorded data with base data that are stored in an evaluation unit and define the geometric orientation of the components of the shield support frame and its movement while advancing, the respective height perpendicular to the stratification can be calculated for the shield support frame at the front end of its roof canopy, which represents a gauge for the height of the face opening.

The known procedure is associated with the disadvantage of complex computing operations, which further require that the base data valid for the respective design of the used shield support frame be accurately determined, and that a useable algorithm be generated for calculating the height perpendicular to the stratification of the shield support frame.

Apart from indirectly determining the height of the face opening mentioned above, a method for directly ascertaining height data by means of a flexible hose level system while boring tunnels is known from DE 43 33 032 C2. Situated between the tunnel boring machine and a reference point here is a flexible hose level system, whose closed, liquid-filled hose is allocated to the reference height at one end, and to the tunnel boring machine at the other end for determining additional measuring height dimensions.

SUMMARY OF THE INVENTION

The object of the invention is to simplify face opening height determination with a generic face equipment.

The central idea underlying the invention provides that, in order to determine the shield height of the extended shield support frame corresponding to the face opening height, a flexible hose level with a liquid-filled hose is installed between the roof canopy and floor skid of individual shield support frames, and a pressure sensor is arranged on the skid-side end of the hose, wherein, in addition to considering a longitudinal and/or transverse inclination of the shield support frame during height determination, an inclination measuring device that permits the measurement of at least two tilting axes towards the horizontal is arranged on the roof canopy, and the pressure sensor and inclination measuring device are connected with an analyzing and control unit.

The invention is associated with the advantage that the flexible hose level arranged on individual shield support frames or even on each shield support frame can be used to ascertain the distance between the two ends of the hose, and thus between the roof canopy and floor skid of the shield support frame, based on the height of the liquid column determined through pressure measurement, and to calculate the absolute height of the extended shield support frame between the upper edge of the roof canopy and the lower edge of the floor skid, taking into account the geometrically fixed position of the hose ends on the roof canopy and floor skid. Since the inclination measuring device arranged on the roof canopy as described in the invention provides additional information about the transverse inclination and longitudinal inclination of the roof canopy, and hence about its location in the room, the trigonometric calculation formulas can be used to convert the result obtained from height determination for the extended shield support frame into the height perpendicular to the stratification for the shield support frame, and hence into the height perpendicular to the stratification for the face opening between the hanging wall and footwall.

With respect to the design of the flexible hose level, a first embodiment of the invention provides that the flexible hose level is designed as a closed flexible hose level with a pressure-filled hose that is closed on both sides and connected to a pressure accumulator. The advantage to a flexible hose level closed on both sides essentially lies in the fact that a barometric correction is not needed, and that degassing-induced density changes in the liquid (for example, dissolved air) play a lesser, and hence negligible, role due to the elevated pressure level in the pressure-filled hose. For example, a disadvantage to the closed flexible hose level is that the liquid contained in the hose is completely chambered. As a result, pinching or temperature changes of the hose and liquid alike can alter the pressure level. In order to minimize this influence, a pre-stressed pressure accumulator blister with a pre-stressed gas that acts against the liquid column is connected to the hose. This also dampens hydraulic pressure fluctuations, e.g. caused by vibrations, while at the same time protecting the pressure sensors against possible pressure spikes. As a consequence, the measuring range of the pressure sensors can also be reduced to improve measuring accuracy.

As an alternative, it can be provided that the flexible hose level be configured as a flexible hose level open on one side, with a hose connected to an overflow forming the highest point of the flexible hose level, for example in the form of an overflow basin arranged on the shield support frame. The advantages to such a flexible hose level open on one side here lie in the fact that a simple hydrostatic pressure/height determination is present. Hose pinching or temperature-induced changes in internal pressure are prevented from influencing the measurement, and there is also only a slight sensitivity to dynamic influences in the form of mechanical oscillations. The disadvantage is that a barometric correction is required for precision measurements. In addition, problems may be encountered with respect to the arrangement of the open flexible hose level in the shield support frame, since the open end of the hose with the overflow basin must always lie at the highest location. This may require reconstruction work given the variable operating conditions that cannot be ruled out during underground mining operations. A flexible hose level overflow or refilling must also be ensured to achieve a properly operating flexible hose level.

An embodiment of the invention can provide that the pressure sensor arranged on the skid-side end of the hose be an absolute pressure sensor.

In order to improve pressure-measuring accuracy and minimize system-induced errors, an embodiment can provide that a second pressure sensor additionally be situated on the roof canopy-side end of the hose. In such a two-sensor system, the difference between the indicated pressures can be used to infer the hydrostatic height difference. A two-sensor system is here associated with the advantage that using the difference in indicated pressures allows a barometric correction given atmospheric air pressure changes. Since the height is derived based upon the difference in pressure between both sensors, the height difference can be measured with little error based on the measured pressure difference, even given changes in the internal pressure of the hose, for example due to bent or pinched hoses.

An embodiment of the invention can here provide that the second pressure sensor also be an absolute pressure sensor.

Since absolute pressure sensors are somewhat less precise in terms of their measuring results and also more expensive to procure by comparison to also known relative pressure sensors, relative pressure sensors can also serve as pressure sensors when using two pressure sensors, and each measure the atmospheric pressure against the fluid pressure.

If it is desirable to determine the free face height as close to the coal face as possible, in particular in proximity to the front end of the roof canopy of the shield support frame, it makes sense to include the elevation of the face conveyor adjoining the coal face. In order to include this elevation of the face conveyor in a determination of face height, another embodiment of the invention can provide that the hose running between the roof canopy and floor skid of the shield support frame extend beyond the skid-side pressure sensor up until the face conveyor, and that a pressure sensor be arranged on the end of the hose secured to the face conveyor. By measuring the liquid height between the face conveyor and roof canopy, this makes it possible to determine the distance between the two aforementioned components, and convert it into the height perpendicular to the stratification of the face height in the manner indicated.

An alternative embodiment can here provide that the hose running between the floor skid and roof canopy extend beyond the roof canopy-side pressure sensor up until the face conveyor, and that a pressure sensor be arranged on the end of the hose secured to the face conveyor. In this embodiment, two height differences can be ascertained, specifically the height difference between the roof canopy and floor skid on the one hand, and the height difference between the roof canopy and face conveyor on the other. In this regard, the fundamentals for calculating the height perpendicular to the stratification of the face height have been improved even further.

In the event a hose that is continuous from the face conveyor up to the roof canopy poses problems in the course of extraction operations, an embodiment of the invention provides that two separate flexible hose levels be used, specifically a first flexible hose level laid between the roof canopy and floor skid of the shield support frame, and a second flexible hose level laid between the floor skid and face conveyor. In order to be able to determine the height between the face conveyor and roof canopy, the floor skid-side ends of the hoses of both flexible hose levels must form an equipotential coupling point.

In order to balance out a motional clearance with respect to the hose running between the shield support frame and face conveyor as the shield support frame advances relative to the face conveyor, it can be provided that the hose or flexible hose section running between the shield support frame and face conveyor be exposed to the force of a retaining spring.

An embodiment of the invention can provide that an inclination measuring device located on the same component of the shield support frame and a pressure sensor each be arranged in a shared sensor housing with shared power supply and measuring line connector.

To improve the data basis for calculating the height of the face opening perpendicular to the stratification, it makes sense in one embodiment of the invention that, in addition to the inclination measuring device situated on the roof canopy of the shield support frame, another inclination measuring device with the same design be arranged on its floor skid, since the location of the floor skid in the room can also be considered in this case.

When including the elevation of the face conveyor in determining the height of the face opening, it is also important to know the location of the face conveyor in the room, so that an embodiment of the invention in this regard provides that an inclination measuring device be arranged on the face conveyor.

In alternative embodiments of the invention, the inclination measuring device can consist of two uniaxial inclination sensors or a respective biaxial inclination sensor. A known triaxial inclination sensor can also be used, even if the measuring results are only required with respect to two tilting axes.

BRIEF DESCRIPTION OF THE DRAWINGS

The drawing presents embodiments of the invention, which will be described below. In the figures:

FIG. 1b shows a front view of the subject matter of FIG. 1a;

FIG. 2 shows an embodiment of the shield support frame according to FIG. 1a, b as part of a face equipment with a flexible hose level continued in addition to the face conveyor;

FIG. 3 shows the subject matter of FIG. 2 in another embodiment;

FIG. 4 shows the subject matter of FIG. 2 or FIG. 3, once again in a further embodiment.

DETAILED DESCRIPTION OF SPECIFIC EMBODIMENTS

Figure 1A:
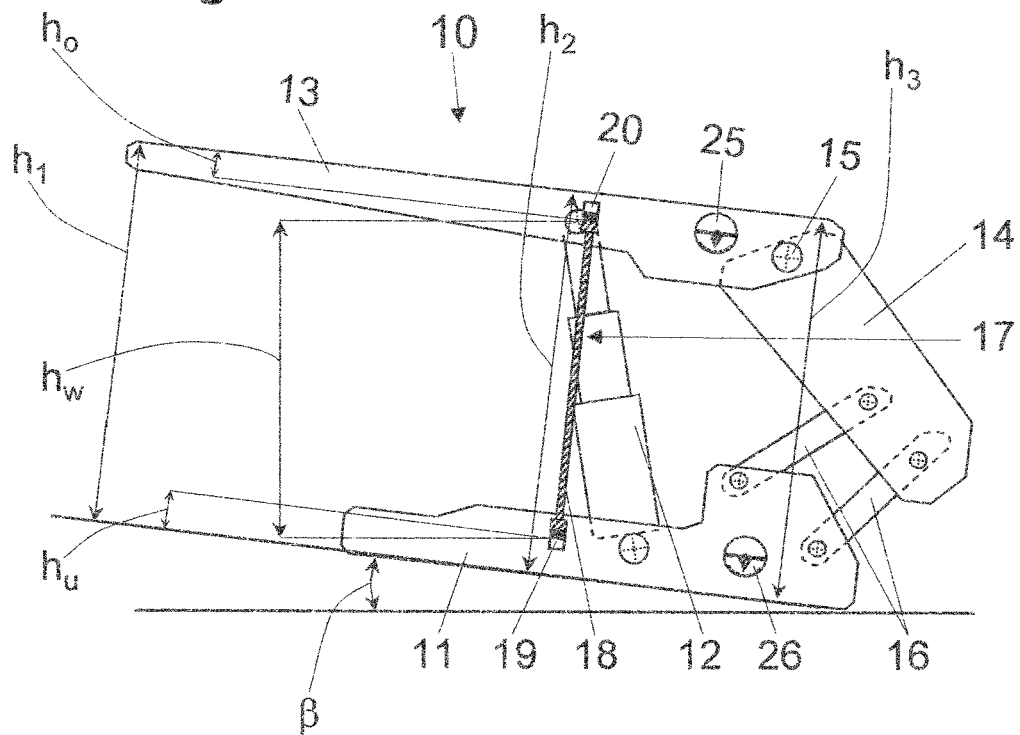
FIG. 1a shows a schematic side view depicting a shield support frame with integrated flexible hose level and inclination measuring device.

The shield support frame 10 schematically depicted on FIG. 1 initially encompasses a floor skid 11, which has attached to it two parallel arranged props 12, of which only one prop can be discerned on FIG. 1a, and whose upper end bears a roof canopy 13. While the roof canopy 13 protrudes at its front (left) end toward an extraction machine not shown on FIG. 1a but visible from FIGS. 2 to 4, the rear (right) end of the roof canopy 13 has secured to it a gob shield 14 by means of a joint 15, wherein the gob shield 14 is supported by two support connections rods 16 resting on the floor skid 11 in the side view.

Arranged on the shield support frame 10 is a flexible hose level 17 with a hose 18 laid between the roof canopy 13 and floor skid 11, whose upper end is situated on the roof canopy 13, and whose lower end is situated on the floor skid 11. Located at both ends are respective pressure sensors, specifically a lower pressure sensor 19 at the end of the hose 18 arranged on the floor skid 11, and an upper pressure sensor 20 at the end of the hose 18 arranged on the roof canopy 13. In the embodiment shown, the flexible hose level 17 is designed as a closed flexible hose level with a closed, pressurized hose 18 that is filled with a suitable liquid, and also connected to a pressure accumulator blister as the pressure accumulator in a manner that is not depicted, yet advantageous. A liquid that can only absorb or dissolve a little gas is desired for use as the liquid. For simplicity's sake, the embodiment assumes that the hose 18 is filled with water, which is also available in the area of the face equipment from a face jet system. The two pressure sensors 19 and 20 designed either as absolute pressure sensors or also as relative pressure sensors that measure the atmospheric pressure against the fluid pressure can be used to directly determine the height of the liquid column $h_w$ independently of the installed length of the hose 18. Provided that the upper end of the hose 18 with the upper pressure sensor 20 situated thereon observes a distance $h_o$ from the upper edge of the roof canopy 13 and correspondingly the lower end of the hose 18 with the lower pressure sensor 19 situated thereon observes a distance $h_u$ from the lower edge of the floor skid 11, the resultant overall height of the shield support frame in the area of the flexible hose level 17 measures $$h_2 = h_u + h_o + h_w$$

If the respective height perpendicular to the stratification of the shield support frame 10 is to be determined as the perpendicular distance between the roof canopy 13 and floor skid 11, this height perpendicular to the stratification also corresponds to the measurable height of the liquid column with the shield support frame in a horizontal position. In practice, however, the positions encountered for a shield support frame 10 in the face room deviate from the ideal perpendicular position of the shield support frames, so that the height perpendicular to the stratification of the shield support frame 10 deviates from the height of the water column of the flexible hose level 17 measurable exclusively as the vertical distance between the pressure sensors. For this reason, this height of the water column $h_w$ must be converted into the respective height perpendicular to the stratification $h_2$, taking into account longitudinal inclinations or transverse inclinations of the shield support frame 10. In order to acquire the data necessary for this conversion, the roof canopy 13 as well as the floor skid 11 in the depicted embodiment each have secured to them an inclination measuring device 25 or 26, which optionally consists of two uniaxial inclination sensors, a biaxial or a triaxial inclination sensor. It is important that the respectively used inclination measuring device make it possible to measure at least two tilting axes against the horizontal.

Figure 1B:
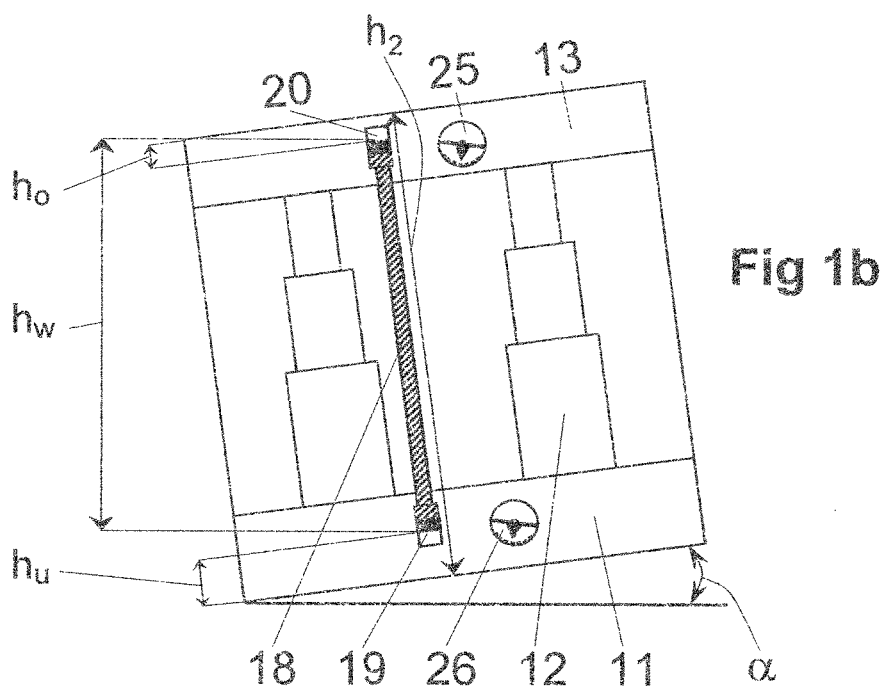

The embodiment shown on FIG. 1a assumes a longitudinal inclination of the shield support frame 10 illustrated by angle β, wherein a transverse inclination of the shield support frame according to angle α is simultaneously assumed based on the front view of the shield support frame on FIG. 1b. The shield support frame 10 positioned in the room as described above yields the height perpendicular to the stratification $h_2$ for the shield support frame 10 as $$h_2 = h_u + h_o + h_w / (\cos \alpha \cdot \cos \beta)$$

Other shield heights in the shield support frame, e.g., as described by $h_1$ or $h_3$, can be trigonometrically calculated using the longitudinal inclination or transverse inclination angle, wherein the key in practice is essentially to determine the height $h_1$ in the front region of the roof canopy 13 in order to avoid collisions with the extraction machine traveling on the accompanying face conveyor. The corresponding, known spatial correlations can here be derived from the embodiments depicted on FIGS. 2 to 4.

In addition to the shield support frame 10, the embodiment shown on FIG. 2 now also depicts the position of an face conveyor 21, upon which can traverse an additionally depicted extraction machine 22 with a hanging wall disc 23 and a footwall disc 24, which is designed as a disc shearer. FIG. 2 in turn reveals the attachment of a flexible hose level 17 to the shield support frame 10, wherein the hose 18 is depicted in a curved progression, since the progression of the hose 18 in particular ultimately depends on the respectively extended height of the props 12 of the shield support frame 10. In this regard, the course of the hose has no influence on determining the variable $h_w$ to be ascertained as the height dimension. An upper pressure sensor 20 is again situated on the upper, roof canopy-side end of the hose 18, and a lower pressure sensor 19 is situated on the lower, floor skid-side end of the hose 18. An inclination measuring device 25 is again arranged on the roof canopy 13, and an inclination measuring device 26 is arranged on the floor skid 11. In particular as relates to monitoring for a collision between the extraction machine 22 guided on the face conveyor 21 and the front end of the roof canopy 13 protruding toward the extraction machine 22, the process of determining the elevation of the face conveyor 21 that carries the extraction machine 22 is included by guiding the hose 18 of the flexible hose level 17 in the embodiment depicted on FIG. 2 beyond the floor skid-side lower sensor 19 with a hose branch 28 leading up to the face conveyor 21, wherein the end of the hose branch 28 is secured to the face conveyor 21. Accordingly, a pressure sensor 29 is also situated on the face conveying-side end of the hose branch 28. In addition to the height of the water column related to the extension height of the shield support frame, this also makes it possible to determine the vertical distance between the face conveyor 21 and the floor skid 11 or simultaneously the roof canopy 13, wherein the respective height of the water column must again be converted taking into account the longitudinal and/or transverse inclinations of the shield support frame 10 and face conveyor 21. Accordingly, an inclination measuring device 27 is also secured to the face conveyor 21.

The embodiment shown on FIG. 3 differs from the embodiment depicted on FIG. 2 and described previously in that including the elevation of the face conveyor 21 is realized by means of an additional hose branch 30, which is created by having the hose 18 of the flexible hose level 17 installed on the shield frame 10 continue beyond the upper pressure sensor 20 secured to the roof canopy 13 until reaching the face conveyor 21. The accompanying pressure sensor 29 is again secured to the face conveyor-side end of the hose branch 30, and an inclination measuring device 27 is also secured to the face conveyor 21.

Yet another alternative embodiment may be seen from FIG. 4, in which an independent second flexible hose level 31 with a hose 33 laid between the face conveyor 21 and floor skid 11 is arranged next to the flexible hose level 17 with the hose 18 installed on the shield support frame 10. If the corresponding pressure sensor 29 is again situated on the end of the hose 33 secured to the face conveyor 21, then another pressure sensor 34 is provided on the end of the hose 33 secured to the floor skid 11 of the shield support frame 10. In order for the process of determining the overall height of the face equipment, and hence the face opening, to include the difference in height between the face conveyor 21 and floor skid 11 determined via the second flexible hose level 31, care must be taken that the pressure sensors 19 and 34 secured to the respective floor skid 11 at the ends of hose 18 and hose 33 form an equipotential coupling point. The advantage to this embodiment is that, in particular due to the special stress placed on the hose 33 running between the face conveyor 21 and floor skid 11 by the constantly recurring relative movements between the shield support frame 10 and face conveyor 21 during face equipment operation, the second flexible hose level 31 with accompanying hose 33 can be easily replaced without touching the flexible hose level 17 installed on the shield support frame 10, so that the process of measuring the height with the flexible hose level 17 need not be interrupted.

The specification incorporates by reference the disclosure PCT/EP2012/055940, filed Apr. 2, 2012.

The present invention is, of course, in no way restricted to the specific disclosure of the specification and drawings, but also encompasses any modifications within the scope of the appended claims.

The features described in the preceding specification or in the following claims or on the attached drawings, in their specific forms, as a means for implementing the described function, or as a method or process for achieving the described result, can be used to implement the invention in their varying forms, whether separately or in any combination of these features.

The invention claimed is:

1. A face equipment for mechanical extraction in longwall mining, comprising:
   a face conveyor (21) arranged along a coal face;
   an extraction mechanism (22) that can be moved along the face conveyor (21);
   shield support frames (10) fastened at an angle to the face conveyor (21);
   a flexible hose level (17) with a liquid-filled hose (18), wherein, in order to determine shield heights of extended shield support frames (10) corresponding to a face opening height, the flexible hose level (17) with a liquid-filled hose (18) is installed between a roof canopy (13) and a floor skid (11) of individual shield support frames (10);
   a pressure sensor (19) arranged on a skid-side end of the hose (18);
   an inclination measuring device (25) arranged on the roof canopy, wherein, in addition to considering a longitudinal and/or transverse inclination of the shield support frames (10) during height determination, the inclination measuring device (25) permits measurement of at least two tilting axes towards the horizontal; and
   an analyzing and control unit, wherein the pressure sensor (19) and inclination measuring device (25) are connected to the analyzing and control unit.

2. The face equipment according to claim 1, wherein the flexible hose level (17) is designed as a closed flexible hose level with a pressure-filled hose (18) that is closed on both sides.

3. The face equipment according to claim 1, wherein the flexible hose level (17) is designed as a flexible hose level open on one side.

4. The face equipment according to claim 1, wherein the pressure sensor (19) arranged on the skid-side end of the hose (18) is an absolute pressure sensor.

5. The face equipment according to claim 1, wherein a second pressure sensor (20) is additionally arranged on a roof canopy-side end of the hose (18).

6. The face equipment according to claim 5, wherein the second pressure sensor (20) is an absolute pressure sensor.

7. The face equipment according to claim 5, wherein the first and second pressure sensors (19, 20) arranged on the skid-side and roof canopy-side ends of the hose (18) are each relative pressure sensors that measure atmospheric pressure against fluid pressure.

8. The face equipment according to claim 7, wherein the hose (18) running between the roof canopy (13) and floor skid (11) of the shield support frame (10) extends beyond the pressure sensor (19) on the skid-side to the face conveyor (21), and wherein a further pressure sensor (29) is arranged on the end of the hose (18, 28) secured to the face conveyor (21).

9. The face equipment according to claim 7, wherein the hose (18) running between the floor skid (11) and roof canopy (13) extends beyond the roof canopy-side pressure sensor (20) on the roof canopy-side to the face conveyor (21), and wherein a further pressure sensor is arranged on the end of the hose (18, 30) secured to the face conveyor (21).

10. The face equipment according to claim 1, wherein a separate, liquid-filled hose (33) closed at both ends with further pressure sensors (29, 34) secured to its respective end sides is installed between the floor skid (11) of the shield support frame (10) and the face conveyor (21) as an additional flexible hose level (31), and wherein the further pressure sensor (34) secured to the floor skid (11) of the shield support frame (10) forms an equipotential coupling point with the first pressure sensor (19) arranged at the end of the hose (18) installed between the roof canopy (13) and floor skid (11) of the shield support frame (10).

11. The face equipment according to claim 1, wherein, in addition to the inclination measuring device (25) situated on the roof canopy (13) of the shield support frame (10), another inclination measuring device (26) with the same design is arranged on the floor skid (11).

12. The face equipment according to claim 8, wherein an inclination measuring device (27) is arranged on the face conveyor (21).

13. The face equipment according to claim 1, wherein the inclination measuring device (25, 26, 27) consists of two uniaxial inclination sensors.

14. The face equipment according to claim 1, wherein the inclination measuring device (25, 26, 27) consists of a biaxial inclination sensor.

15. The face equipment according to claim 1, wherein the inclination measuring device (25, 26, 27) consists of a triaxial inclination sensor.

* * * * *